US012801086B2

(12) United States Patent
Christan

(10) Patent No.: US 12,801,086 B2
(45) Date of Patent: Nov. 17, 2026

(54) DEVICE FOR PINNING UP TO THE STUD AND ADJUSTING THE ACTIVE LENGTH OF A BALANCE-SPRING FOR A HOROLOGICAL MOVEMENT AND PROCESS FOR SETTING THE ACTIVE LENGTH

(71) Applicant: ETA SA MANUFACTURE HORLOGÈRE SUISSE, Grenchen (CH)

(72) Inventor: Julien Christan, Bienne (CH)

(73) Assignee: ETA SA MANUFACTURE HORLOGÈRE SUISSE, Grenchen (CH)

( * ) Notice: Subject to any disclaimer, the term of this patent is extended or adjusted under 35 U.S.C. 154(b) by 259 days.

(21) Appl. No.: 18/397,554

(22) Filed: Dec. 27, 2023

(65) Prior Publication Data

US 2024/0255896 A1 Aug. 1, 2024

(30) Foreign Application Priority Data

Jan. 31, 2023 (EP) .................................... 23154309

(51) Int. Cl.
*G04B 18/04* (2006.01)
*G04B 18/00* (2006.01)

(52) U.S. Cl.
CPC ........... *G04B 18/04* (2013.01); *G04B 18/006* (2013.01)

(58) Field of Classification Search
CPC .... G04B 18/04; G04B 17/063; G04B 18/006; G04B 17/066; G04B 18/06
See application file for complete search history.

(56) References Cited

U.S. PATENT DOCUMENTS 30,873 A * 12/1860 Dennison ............. G04B 18/026 368/176
65,116 A * 5/1867 Ramsay ................. G04B 17/06 968/109
185,872 A * 1/1877 Solomon ................... F16F 1/10 74/1.5
273,138 A * 2/1883 Smith .................... G04B 18/06 368/176

(Continued)

FOREIGN PATENT DOCUMENTS

CH 321947 A 5/1957
CN 109426125 A 3/2019

(Continued)

OTHER PUBLICATIONS

Translation of 321947 (Year: 2025).*
European Search Report for EP23154309 dated Aug. 14, 2023.

*Primary Examiner* — Sean Kayes
(74) *Attorney, Agent, or Firm* — Sughrue Mion, PLLC

(57) ABSTRACT

The invention relates to a device (1) for pinning up to the stud and setting an active length of a balance-spring (2) for a horological movement, this balance-spring (2) being arranged in coils along a determined length, this device (1) comprising a push-button (6) arranged to hold the balance-spring (2) mechanically at a location of the length of this balance-spring (2).

The invention also relates to a process for setting the active length of the balance-spring by means of the device (1) for setting and adjusting the active length of the balance-spring.

16 Claims, 4 Drawing Sheets

(56) References Cited

U.S. PATENT DOCUMENTS

| | | | | |
|---|---|---|---|---|
| 586,562 | A * | 7/1897 | Overjorde | G04D 1/08 29/232 |
| 1,114,500 | A * | 10/1914 | McIntyre | G04B 18/023 368/174 |
| 1,144,026 | A * | 6/1915 | Busenbenz | G04B 18/021 368/173 |
| 1,311,501 | A * | 7/1919 | Ecaubert | G04B 18/06 368/178 |
| 3,456,178 | A * | 7/1969 | Kavanaugh | H02P 7/291 388/921 |
| 2016/0154379 | A1 | 6/2016 | Bertrand et al. | |
| 2017/0351219 | A1 * | 12/2017 | Paratte | G04B 18/00 |

FOREIGN PATENT DOCUMENTS

| | | | |
|---|---|---|---|
| CN | 221668195 | U | 9/2024 |
| EP | 2 881 804 | A2 | 6/2015 |
| FR | 2 063 156 | A1 | 7/1971 |
| JP | 50-26862 | U | 3/1975 |
| JP | 11-194174 | A | 7/1999 |

* cited by examiner

DEVICE FOR PINNING UP TO THE STUD AND ADJUSTING THE ACTIVE LENGTH OF A BALANCE-SPRING FOR A HOROLOGICAL MOVEMENT AND PROCESS FOR SETTING THE ACTIVE LENGTH

CROSS REFERENCE TO RELATED APPLICATIONS

This application claims priority from European Patent Application No. 23154309.1 filed Jan. 31, 2023.

TECHNICAL FIELD OF THE INVENTION

The present invention relates to a device for pinning up to the stud and adjusting the active length of a balance-spring for a horological movement.

TECHNOLOGICAL BACKGROUND

Hereinafter, by convention, the term "component" will refer to a spare part used in the composition of the device for pinning up to the stud and adjusting the active length of a balance-spring according to the invention, and "part" to an assembly of two or more "components".

In a timepiece with a mechanical movement, the setting organ consists of the spring balance assembly with the escapement. These different elements are set in motion thanks to the mechanical energy supplied by a barrel spring and perform counting and division of time into seconds. It is therefore understood that the precision of the setting of the functioning of the spring balance assembly is dependent on the precision of the time indication supplied by the timepiece with a mechanical movement.

A first known technique to ensure the precision of the rate of a spring balance assembly is that of providing the balance with a plurality of inertia-blocks for example fastened adjustably to the balance felloe. Adjusting the position of these inertia-blocks influences the inertia of the balance, which modifies the pivoting frequency of this spring balance assembly.

Another known technique for ensuring the precision of the rate of a spring balance assembly consists of equipping this spring balance assembly with an index-assembly comprising at least one index and an index key which is borne by the index and which is provided with a slot wherein the balance-spring fits. The index key can be pivoted on itself, whereas the index can be pivoted about the pivoting axis of the spring balance assembly, on a shoulder of a bridge, or about a shock-absorber bearing.

The portion of the balance-spring which extends from the index key to the centre of this balance-spring defined by the free end of the inner last coil of this balance-spring determines the active length of the balance-spring.

The portion of the balance-spring which extends between a balance-spring stud whereon is fastened the free end of the outer last coil of the balance-spring and the index key is considered as mechanically rigid and does not contribute to the oscillations of the balance.

The position of the index key defines a so-called counting point. The position of this counting point can be modified by pivoting the index. Modifying the position of the counting point modifies the usable length of the balance-spring and therefore the frequency of the beats of the spring balance assembly. Pivoting the index key on itself limits the travels of the balance-spring inside the slot arranged in this index key, however taking care not to completely lock this balance-spring of course. This has the effect of improving the precision of the setting of the beat frequency of the spring balance assembly and therefore the rate precision of this assembly.

As will be understood from the above, in a number of mechanical movements for timepieces, equipping a spring balance assembly with means for setting the frequency thereof requires a substantial number of components (balance-spring stud for pinning up to the stud the free end of the outer last coil of the balance-spring, optionally stud support, index, index tail and eccentric screw for fine-setting the position of the index, index key), which is costly and requires a relatively long setting time in order to adjust the pivoting frequency with precision. The other solution consisting of adjusting the inertia of the balance by means of setting screws is even more costly in terms of machining operations and in setting time of the pivoting frequency of the spring balance assembly.

SUMMARY OF THE INVENTION

The aim of the invention is that of remedying the drawbacks mentioned above as well as others by providing a simpler and more economical device for both pinning up to the stud and setting the active length of a balance-spring of a horological movement.

To this end, the present invention relates to a device for pinning up to the stud and setting an active length of a balance-spring for a horological movement, this balance-spring being formed from a spiral strip of a predetermined length, this device comprising a push-button arranged to hold the balance-spring mechanically at a location of the length of the strip of this balance-spring.

According to a special embodiment of the invention, the push-button is composed of a button and a tube wherein the button is capable of sliding, the button being returned elastically to a locking position by an elastic organ, the button being, in an operating position, kept separate from the locking position thereof by the insertion of a portion of the strip of the balance-spring between the button and the tube, which ensures the mechanical hold of the balance-spring.

According to another special embodiment of the invention, the button extends between a head and a foot wherein a groove is arranged which goes at least partially around the foot and wherein is engaged a portion of the balance-spring at the location where it is sought to stop the balance-spring by gripping between the foot of the button and an end facing the tube along two distinct points, so as to enable the push-button to transmit a holding torque to the balance-spring so that this balance-spring does not slide or does not turn about its fastening point over the lifetime of the timepiece.

According to another special embodiment of the invention, the groove extends along an entire outer perimeter of the button.

According to another special embodiment of the invention, the elastic organ is a spring.

According to another special embodiment of the invention, the spring is an elastic strip.

According to another special embodiment of the invention, the button is provided with a groove wherein is engaged the portion of the strip of the balance-spring, the presence of which holds the button in the operating position.

According to another special embodiment of the invention, the groove extends along an entire outer perimeter of the button.

According to another special embodiment of the invention, the push-button is fastened to a bridge of the horological movement.

According to another special embodiment of the invention, the device for pinning up to the stud and setting the active length of the balance-spring comprises a push-piece support component which bears the push-button, this push-piece support component being arranged to be capable of pivoting about a pivoting axis of a spring balance assembly of the horological movement.

According to another special embodiment of the invention, the push-piece support is mounted pivoting on a support.

According to another special embodiment of the invention, the support is a balance bridge or a bearing borne by this bridge.

According to another special embodiment of the invention, the bearing is a shock-absorbing bearing.

According to another special embodiment of the invention, a scale comprising a plurality of graduations, each of which corresponds to a gain or loss time fraction of the horological movement is mounted on a bridge of a plate of the horological movement or on the plate.

According to another of its aims, the invention relates to a balance-spring formed from a spiral strip of a determined length for a horological movement, at least a portion of the strip being provided with a scale comprising a plurality of graduations, each of which corresponds to a gain or loss time fraction of the horological movement.

According to another embodiment of the invention, the scale comprises graduations which each represent 0.1 s.

The invention also relates to a process for setting the active length of a balance-spring of a horological movement by means of the device according to the invention, wherein, to adjust the active length of the balance-spring, the balance-spring is momentarily released by pressing on the push-button, then a balance the beats of which are provided by the balance-spring is pivoted by a desired angle, then the pressure is released on the push-button to once again stop the balance-spring, the pivoting of the balance triggering the movement of a guide-mark which is subsequently realigned by turning the device.

Thanks to these features, the present invention provides a device making it possible both to pin a balance-spring of a horological movement up to the stud and to set the active length thereof in order to adjust the pivoting frequency of the spring balance with precision. The balance-spring being pinned up to the stud without requiring glue, it can be repositioned at all times such that, if required, the pivoting frequency of the spring balance can be set over the lifetime of the timepiece, for example when returned to the factory. Furthermore, given that no constraint is applied by considerations linked with the choice of glue, the horologist designer benefits from total freedom in terms of the choice of material of which the balance-spring is made.

In the simplified embodiment thereof, the device according to the invention thus makes it possible advantageously to combine the balance-spring stud and index functions, which makes it possible to reduce the number of components required and simplify the integration of the device according to the invention into a horological movement due to a reduced size.

Moreover, in a preferred embodiment of the invention, the device comprises a push-piece support part thanks to which the device for pinning up to the stud and adjustment can be mounted pivoting about a pivoting axis of a spring balance assembly, which makes it possible to set the guide-mark of the balance.

Thus, quite remarkably, the present invention provides a device which, by means of single part, makes it possible to group together up to four separate functions for a balance-spring of a horological movement which appear at first glance to be mutually incompatible, namely: repositionable pinning up to the stud, mounting the stud support on its support, setting the active length and setting the guide-mark.

It will also be noted that, in the prior art, the fastening point of the balance-spring is conventionally provided by a balance-spring stud whereas the setting of the counting point is performed by means of an index key. On the other hand, according to the invention, the device makes it possible to group together at a single point both the fastening point of the balance-spring and the counting point. One of the advantages of this device is that it can thus make it possible, in a simplified embodiment of the invention, to use a balance of the spring balance assembly which is devoid of specific means for setting the inertia thereof, which makes it possible to make substantial savings.

BRIEF DESCRIPTION OF THE FIGURES

Other special embodiments and advantages of the present invention will be better understood upon reading the following detailed description of one embodiment of a device for pinning up to the stud and adjusting the active length of a balance-spring according to the invention, said example being provided for the purposes of illustration only and not intended to limit the scope of the invention, given with reference to the accompanying drawing, in which.

DETAILED DESCRIPTION OF THE INVENTION

The present invention stems from the general inventive idea which consists of bringing together in a single part at least some of the functions relating to a balance-spring intended to provide the isochronous beats of a balance of a spring balance assembly of a horological movement. For this purpose, the present invention provides a device comprising firstly a push-button arranged so as to stop a balance-spring of a horological movement at a location of the length thereof without needing to use glue. Hence, the horologist designer benefits from complete freedom in terms of the choice of material of which the balance-spring is made and, furthermore, given that the balance-spring is not glued, the device according to the invention can be dismantled at any time, for example when the timepiece is returned to the factory. Consequently, the device according to the invention already allows, firstly, repositionable pinning of the balance-spring up to the stud. On the other hand, thanks to the use of a push-button, the balance-spring can be stopped at any location of the length thereof, which allows the setting of the active length of this balance-spring, i.e. the distance separating the point where the balance-spring is stopped by the push-button from the free end of the first coil inside this balance-spring. The device according to the invention therefore makes it possible to set ad libitum the pivoting frequency of the spring balance assembly equipped with the device according to the invention. Finally, in the preferred embodiment thereof, the device according to the invention is equipped with a push-piece support which allows the fixed mounting thereof for example on a bridge of the horological movement, or the pivoting mounting thereof on a support such as balance bridge or a bearing borne by this bridge. In this embodiment, the device according to the invention thus fulfils four separate functions: repositionable pinning up to the stud of the balance-spring, mounting of the stud support on its support, setting the active length of said balance-spring, and setting the guide-mark of the balance. The device according to the invention, consisting of a single part formed, in a simplified alternative embodiment, from a tube, a button and an elastic organ, therefore advantageously replaces the assembly of the components of the prior art such as balance-spring stud, stud support, index, index key, index tail and eccentric, which makes it possible to reduce the number of components required to fasten the balance-spring and for setting the pivoting frequency of the spring balance assembly, and facilitates the mounting of the device according to the invention in the horological movement on account of the reduced size thereof. Another key advantage of the invention lies in the fact that it makes it possible to avoid any use of glue.

Figure 1:
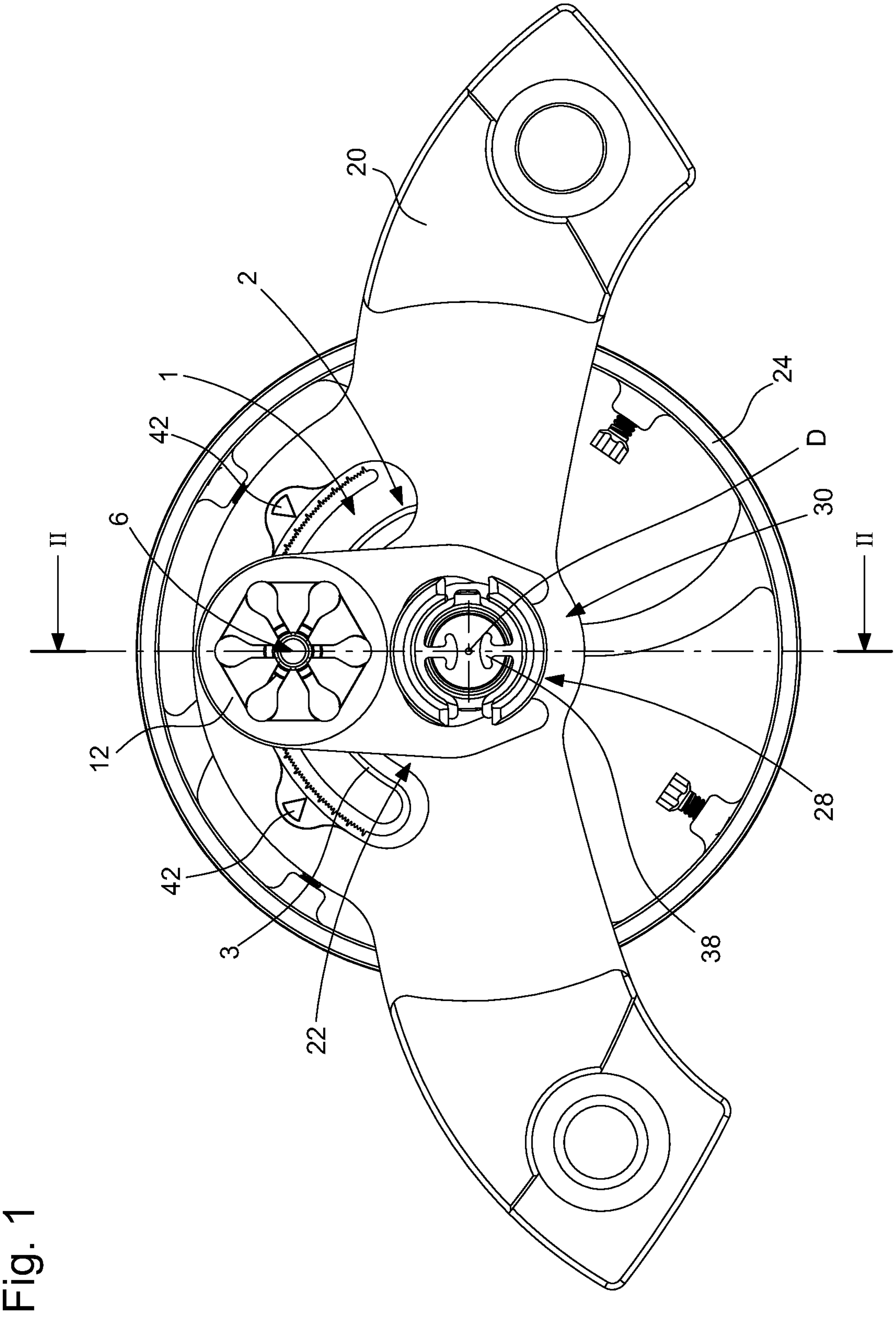
FIG. 1 is a top view of the device for pinning up to the stud and setting the active length of a balance-spring for a horological movement according to the invention.
Figure 2:
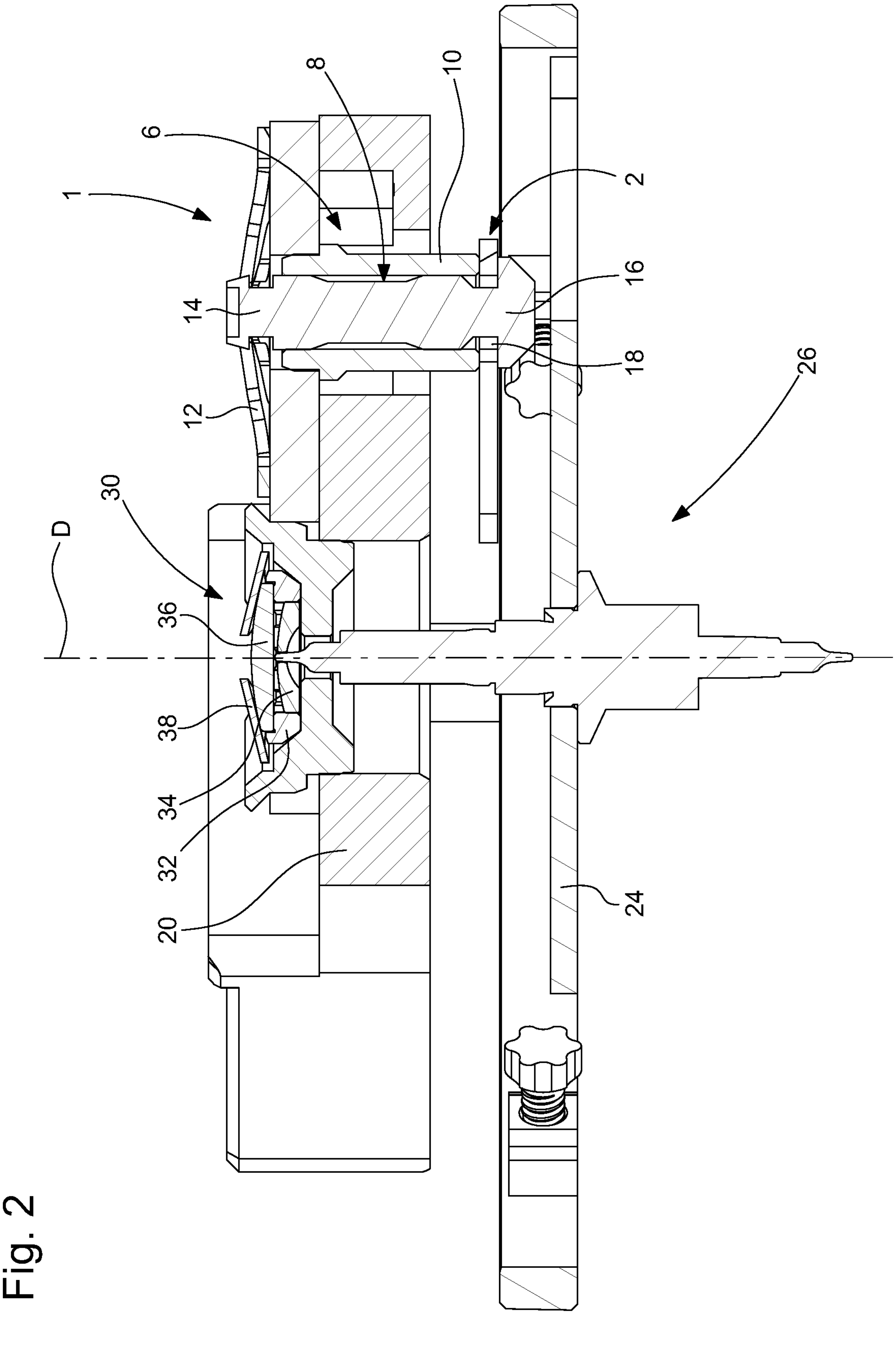
FIG. 2 is a sectional view along the sectional line II-II of FIG. 1.

Designated as a whole by general reference number 1, the device according to the invention is represented as a top view in FIG. 1, and as a sectional view along the line II-II of FIG. 1 in FIG. 2.

In a simplified embodiment thereof, the device 1 according to the invention enables the pinning up to the stud of a balance-spring 2 for a horological movement, and the setting of an active length of this balance-spring 2.

The balance-spring 2, arranged in coils, has a determined length between a free end of an inner first coil and a free end of an outer last coil 3. For example only, the balance-spring 2 can be shaped into a flat strip delimited by first and second faces which extend parallel with and at a distance from one another.

More specifically, the device 1 according to the invention makes it possible to stop, advantageously removably as described hereinafter, the balance-spring 2 at any location of the length thereof, and to set the length separating a point 4 wherein this balance-spring 2 is stopped from the free end of the first coil inside said balance-spring 2.

To this end, the device 1 according to the invention comprises firstly a push-button 6 arranged to hold in a releasable manner the balance-spring 2 at a location of the length of the strip of this balance-spring 2.

As seen in FIG. 2, the push-button 6 comprises essentially a button 8 and a tube 10 wherein the button 8 is capable of sliding. Advantageously, the button 8 is returned elastically to a locking position by an elastic organ 12 such as a spring or an elastic strip (see, in particular, FIG. 1).

The button 8 is, in an operating position, kept separate from its locking position by inserting a portion of the balance-spring 2 between the button 8 and the tube 10, which ensures the mechanical stopping of the balance-spring 2.

According to one of the essential advantages of the invention, it is easily understood that the balance-spring 2 can be released at any time from its engagement with the push-button 6. For this, it is simply necessary to apply a pressure on the button 8 going against the return force of the elastic organ 12 so as to make it come out of the tube 10 more. Moreover, it is understood that via a suitable choice of the coefficient of rigidity of the elastic organ 12, it is possible to control precisely the gripping force exerted on the balance-spring 2 when it is kept immobile between the button 8 and the tube 10 of the push-button 6. Consequently, the risks of breaking the balance-spring 2, in particular when it is made of silicon, are limited.

It is seen in FIG. 2 that the button 8 extends between a head 14 and a foot 16 wherein a groove 18 which goes at least partially around the foot 16 is arranged. Subsequently, the balance-spring 2 is passed around the foot 16 of the button 8 in its portion where it is sought to be stopped by the push-button 6 by gripping between the foot 16 of the button 8 and the end facing the tube 10. The balance-spring 2 is thus gripped between the foot 16 of the button 8 and the end facing the tube 10 along two points, which enables the push-button 6 to transmit a holding torque to the balance-spring 2 so that this balance-spring 2 does not slide or does not turn about its fastening point over the lifetime of the timepiece.

Figure 5:
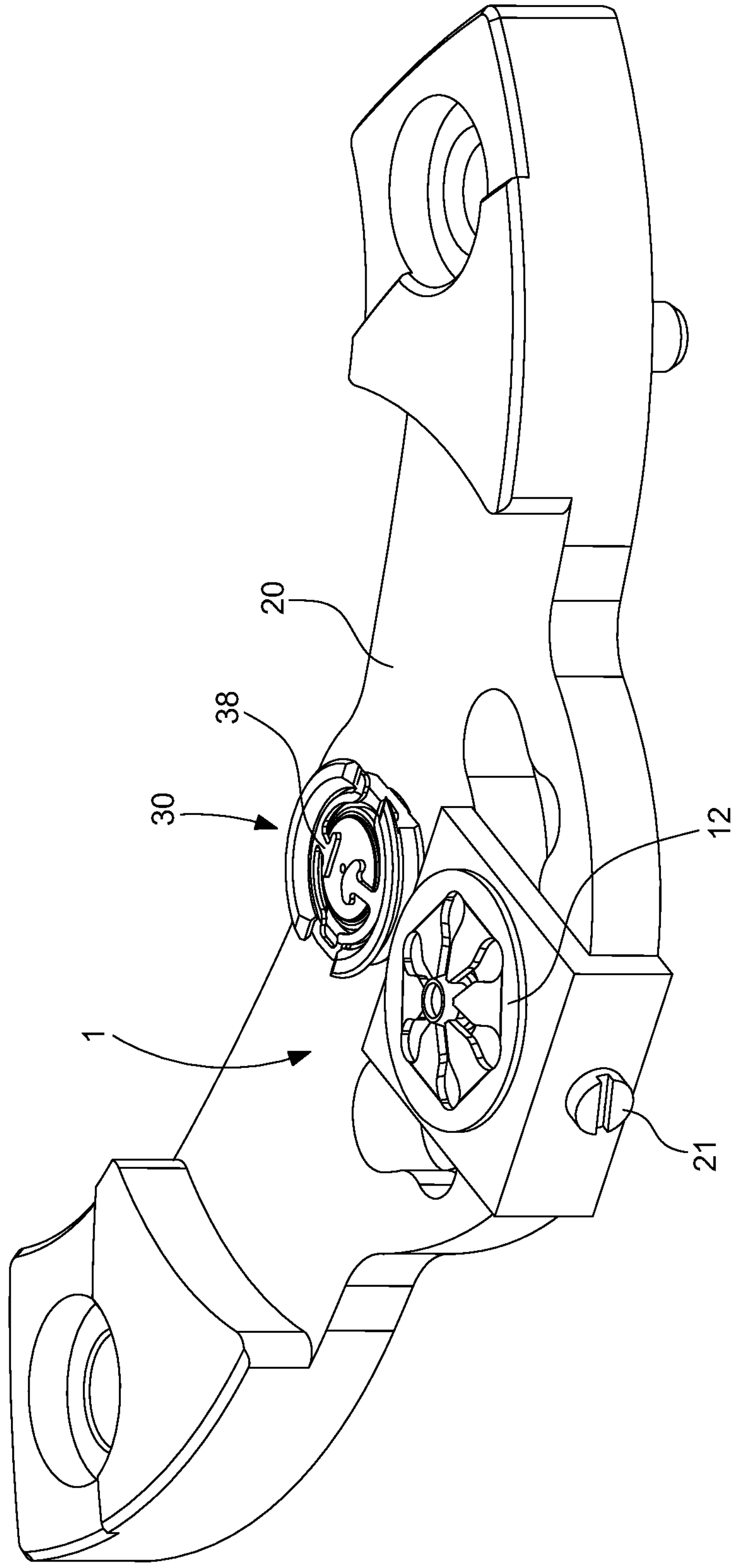
FIG. 5 is a schematic representation of the device according to the invention fastened to a bridge of the horological movement by means of a screw.

According to a simplified embodiment of the invention illustrated in FIG. 5, the device 1 according to the invention and its push-button 6 are simply fastened to a bridge 20 of a plate of the horological movement, typically by means of a screw 21.

According to an enhanced embodiment of the invention, the device 1 for pinning up to the stud and setting the active length of the balance-spring 2 further comprises a push-piece support 22 which bears the push-button 6, and a balance 24 forming part of a spring balance assembly 26. The push-piece support 22 is arranged to be capable of pivoting about a pivoting axis D of the spring balance assembly 26 of the horological movement.

In this aim, the push-piece support 22 is provided with an opening 28 the internal diameter of which is adjusted to the external diameter of the pivoting axis D of the spring balance assembly 26. The device 1 according to the invention thus advantageously fulfils both the function of balance-spring stud and of stud support.

As shown in FIGS. 1 and 2, the spring balance assembly 26 is preferably pivoted in a shock-absorbing bearing 30 conventionally comprising a setting 32, a stone with a hole 34, an endstone 36 and a spring 38.

Figure 3:
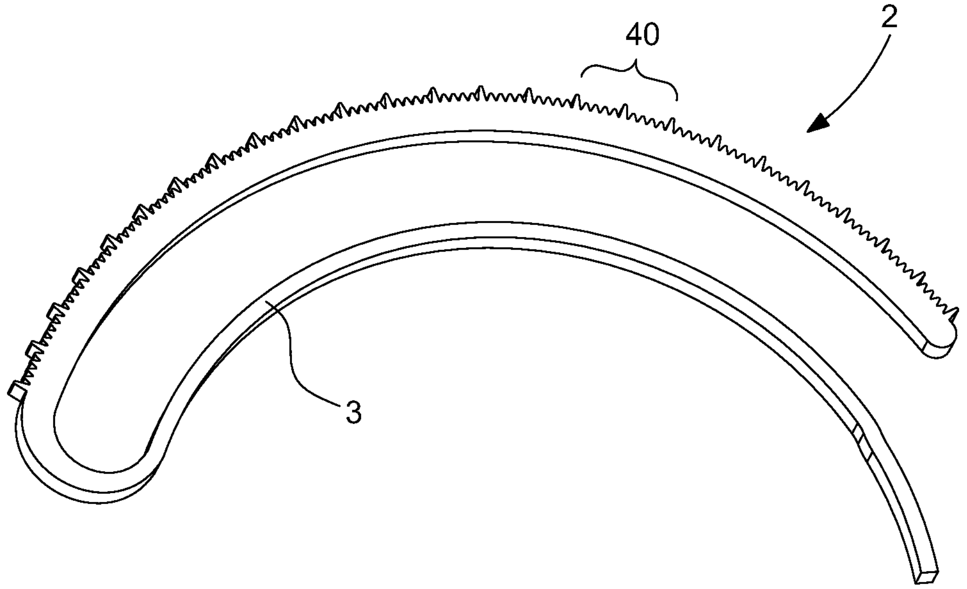
FIG. 3 is a perspective view of a particular embodiment of the terminal curve of a balance-spring particularly adapted for cooperating with the device according to the invention.
Figure 4:
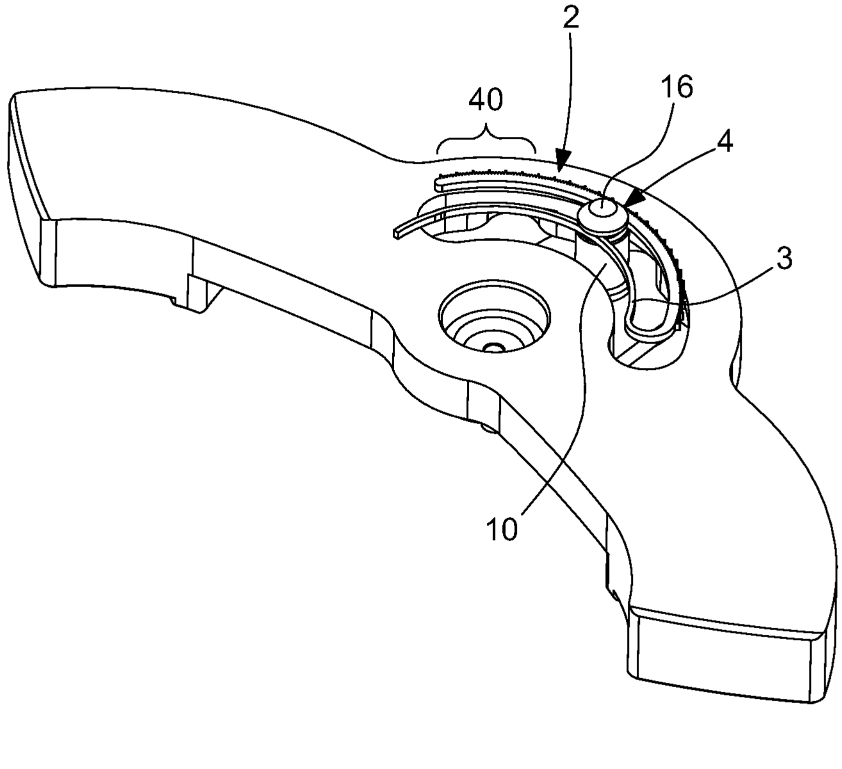
FIG. 4 is a bottom perspective view showing the arrangement between the push-button of the device according to the invention and the balance-spring of FIG. 3.

It goes without saying that the present invention is not limited to the embodiment described hereinabove, and that various simple alternatives and modifications can be considered by a person skilled in the art without leaving the scope of the invention as defined by the accompanying claims. It will be noted in particular that to facilitate the setting of the active length of the balance-spring 2, a portion at least of the spiral strip forming this balance-spring 2 can be provided with a scale 40 of which each graduation represents for example a variation of 0.1 s as seen in FIGS. 3 and 4. To adjust the active length of the balance-spring 2, it is simply necessary to press the button 8 of the push-button 6 to momentarily release the balance-spring 2, then pivot the balance 24 by the desired angle to correct a known gain or loss. For example, if the horological movement gains 1 second per day, the spring balance assembly 26 is moved to induce a loss by moving 10 graduations of 0.1 s in front of an index 42. Then the pressure is released on the button 8 of the push-button 6 to once again stop the spring balance 2. The pivoting of the balance 24 will also trigger the movement of a guide-mark which can then be realigned by turning the device 1 which is composed of the push-button 6 and the push-piece support 22 bearing the push-button 6. It will obviously be understood that this operation is not possible in the case of the simplified embodiment of the invention illustrated in FIG. 5. It will also be noted that, in the sense of the invention, push-button denotes an assembly formed from a cylinder and tube inside which the cylinder is capable of sliding against the elastic return force of a spring. It will similarly be noted that, as already mentioned above, the stopping of the balance-spring 2 is performed along two points located for one on the terminal curve and for the other in the region where the scale can be provided.

NOMENCLATURE

1. Device
2. Balance-spring
3. Outer last coil
4. Point
6. Push-button
8. Button
10. Tube
12. Elastic organ
14. Head
16. Foot
18. Groove
21. Screw
22. Push-piece support
24. Balance
D. Pivoting axis
26. Spring balance assembly
28. Opening
30. Shock-absorbing bearing
32. Setting
34. Stone with hole
36. Endstone
38. Spring
40. Scale
42. Index

The invention claimed is:

1. A device (1) for pinning up to a stud and setting an active length of a balance-spring (2) for a horological movement, the balance-spring (2) being arranged in coils along a determined length, the device (1) comprising a push-button (6) arranged to directly mechanically engage and hold the balance-spring (2) at a location along the length of this balance-spring (2).

2. The device (1) according to claim 1, wherein the push-button (6) is composed of a button (8) and a tube (10) wherein the button (8) is capable of sliding, the button (8) being returned elastically to a locking position by an elastic organ (12), the button (8) being, in an operating position, kept separate from the locking position thereof by the insertion of a portion of the balance-spring (2) between the button (8) and the tube (10), which ensures the mechanical hold of the balance-spring (2).

3. The device (1) according to claim 2, wherein the button (8) extends between a head (14) and a foot (16) wherein a groove (18) is arranged which goes at least partially around the foot (16) and wherein is engaged a portion of the balance-spring (2) at the location where it is sought to stop the balance-spring (2) by gripping between the foot (16) of the button (8) and an end facing the tube (10) along two distinct points, so as to enable the push-button (6) to transmit a holding torque to the balance-spring (2) so that the balance-spring (2) does not slide or does not turn about its fastening point over the lifetime of the timepiece.

4. The device (1) according to claim 3, wherein the groove (18) extends along an entire outer perimeter of the button (8).

5. The device (1) according to claim 2, wherein the elastic organ (12) is a spring.

6. The device (1) according to claim 5, wherein the spring is an elastic strip.

7. The device (1) according to claim 1, wherein the button (8) is provided with a groove (18) which is engaged by the portion of the balance-spring (2) to hold the button (8) in the operating position.

8. The device (1) according to claim 1, wherein the push-button (6) is fastened to a balance bridge (20) of the horological movement.

9. The device (1) according to claim 1, wherein the device (1) for pinning up to the stud and setting the active length of the balance-spring (2) comprises a push-piece support (22) which bears the push-button (6), the push-piece support (22) being arranged to be capable of pivoting about a pivoting axis (D) of a spring balance assembly (26) of the horological movement.

10. The device (1) according to claim 8, wherein the push-piece support (22) is mounted pivoting on a support.

11. The device (1) according to claim 10, wherein the support is a balance bridge (20) or a bearing borne by the bridge.

12. The device (1) according to claim 11, wherein the bearing is a shock-absorbing bearing (30).

13. The device (1) according to claim 1, wherein a scale (40) comprising a plurality of graduations, each of which corresponds to a gain or loss time fraction of the horological movement is mounted on a bridge (20) of a plate of the horological movement or on the plate.

14. A process for setting the active length of a balance-spring (2) of a horological movement by means of the device (1) according to claim 1, wherein, to adjust the active length of the balance-spring (2), the balance-spring (2) is momentarily released by pressing on the push-button (6), then a balance (24) the beats of which are provided by the balance-spring (2) is pivoted by a desired angle, then the pressure is released on the push-button (6) to once again stop the balance-spring (2), the pivoting of the balance (24) triggering the movement of a guide-mark which is subsequently realigned by turning the device (1).

15. A device (1) for pinning up to a stud and setting an active length of a balance-spring (2) for a horological movement, the balance-spring (2) being arranged in coils along a determined length, the device (1) comprising a push-button (6) arranged to hold the balance-spring (2) mechanically at a location along the length of the balance-spring (2), wherein the push-button (6) is composed of a button (8) and a tube (10) wherein the button (8) is capable of sliding, the button (8) being returned elastically to a locking position by an elastic organ (12), the button (8) being, in an operating position, kept separate from the locking position thereof by the insertion of a portion of the balance-spring (2) between the button (8) and the tube (10), which ensures the mechanical hold of the balance-spring (2).

16. A balance-spring for a horological movement, the balance-spring comprising a scale portion and an integral spiral strip portion, the scale portion comprising a scale comprising a plurality of graduations, each of which corresponds to a gain or loss time fraction of the horological movement.

* * * * *